US008916249B2

(12) United States Patent
Liang et al.

(10) Patent No.: US 8,916,249 B2
(45) Date of Patent: *Dec. 23, 2014

(54) POLYMERIC COMPOSITION WITH SEALANT LAYER WITH SAME

(75) Inventors: Wenbin Liang, Pearland, TX (US); Kim L. Walton, Lake Jackson, TX (US); Gary R. Marchand, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/823,245

(22) PCT Filed: Sep. 29, 2011

(86) PCT No.: PCT/US2011/053816
§ 371 (c)(1),
(2), (4) Date: Mar. 14, 2013

(87) PCT Pub. No.: WO2012/044730
PCT Pub. Date: Apr. 5, 2012

(65) Prior Publication Data
US 2013/0183465 A1 Jul. 18, 2013

Related U.S. Application Data

(60) Provisional application No. 61/388,439, filed on Sep. 30, 2010.

(51) Int. Cl.
| B29C 47/00 | (2006.01) |
| B32B 27/08 | (2006.01) |
| B32B 27/32 | (2006.01) |
| C08F 297/08 | (2006.01) |
| C08J 5/18 | (2006.01) |
| C08L 23/14 | (2006.01) |
| B32B 1/02 | (2006.01) |
| C08L 23/06 | (2006.01) |
| C08L 53/00 | (2006.01) |

(52) U.S. Cl.
CPC .............. *B32B 27/32* (2013.01); *C08F 297/08* (2013.01); *C08J 5/18* (2013.01); *C08L 23/14* (2013.01); *B32B 1/02* (2013.01); *C08J 2323/14* (2013.01); *C08J 2423/06* (2013.01); *C08J 2453/00* (2013.01); *C08L 23/06* (2013.01); *C08L 53/00* (2013.01)
USPC .......................................... 428/36.9; 428/515

(58) Field of Classification Search
USPC ................... 428/35.2, 35.7, 35.9, 36.91, 515; 525/88, 95
See application file for complete search history.

(56) References Cited

U.S. PATENT DOCUMENTS

| 3,645,992 A | 2/1972 | Elston |
| 4,076,698 A | 2/1978 | Anderson et al. |

(Continued)

FOREIGN PATENT DOCUMENTS

| WO | 2005/090426 A1 | 9/2005 |
| WO | 2007/035485 A1 | 3/2007 |

(Continued)

*Primary Examiner* — James Yager
(74) *Attorney, Agent, or Firm* — Whyte Hirschboeck Dudek S.C.

(57) ABSTRACT

Disclosed herein is a polymeric composition. The polymeric composition includes: (A) a propylene/a-olefin interpolymer; (B) an ethylene-based polymer; (C) a block composite comprising: i) a propylene-based crystalline polymer; ii) an ethylene/a-olefin polymer; and iii) a block copolymer comprising a propylene-based crystalline block and an ethylene/a-olefin block. The polymeric composition provides improved heat seals when formed into film, film layer, or flexible containers such as a retort pouch.

13 Claims, 5 Drawing Sheets

(56) References Cited

U.S. PATENT DOCUMENTS

| | | |
|---|---|---|
| 5,272,236 A | 12/1993 | Lai et al. |
| 5,278,272 A | 1/1994 | Lai et al. |
| 5,462,807 A | 10/1995 | Halle et al. |
| 6,054,544 A | 4/2000 | Finlayson et al. |
| 6,335,410 B1 | 1/2002 | Finlayson et al. |
| 6,723,810 B2 | 4/2004 | Finlayson et al. |
| 7,355,089 B2 | 4/2008 | Chang |
| 7,582,716 B2 | 9/2009 | Liang |
| 8,476,366 B2 * | 7/2013 | Walton et al. .................. 525/95 |
| 8,686,087 B2 * | 4/2014 | Li Pi Shan et al. ........... 524/505 |
| 2003/0211350 A1 | 11/2003 | Migliorini et al. |
| 2004/0081842 A1 | 4/2004 | Peet |
| 2006/0199912 A1 | 9/2006 | Fuchs et al. |
| 2006/0199930 A1 | 9/2006 | Li Pi Shan et al. |
| 2007/0167578 A1 | 7/2007 | Arriola et al. |
| 2007/0287007 A1 | 12/2007 | Williams et al. |
| 2008/0311812 A1 | 12/2008 | Arriola et al. |
| 2013/0177720 A1 * | 7/2013 | Liang et al. .................. 428/35.2 |
| 2013/0183465 A1 * | 7/2013 | Liang et al. .................. 428/35.2 |
| 2014/0072743 A1 * | 3/2014 | Stephenne et al. ........... 428/36.4 |

FOREIGN PATENT DOCUMENTS

| | | |
|---|---|---|
| WO | 2009/012215 A1 | 1/2009 |
| WO | 2011/041696 A1 | 4/2011 |

* cited by examiner

POLYMERIC COMPOSITION WITH SEALANT LAYER WITH SAME

CROSS REFERENCE TO RELATED APPLICATION

The present application is the national phase of PCT Patent Application No. PCT/US2011/053816 filed Sep. 29, 2011, which claims priority to U.S. provisional application Ser. No. 61/388,439 filed on Sep. 30, 2010, the entire content of which is incorporated by reference herein.

BACKGROUND

Plastic films find utility in a wide variety of packaging applications such bags, containers, cups, pouches, tubes, and trays. Laminates, single layer films, and multi-layer films having a heat-sealable layer are often used in "form, fill, and seal" (FFS) machines. FFS machines create a continuous stream of packages from the film, the packages capable of being closed by film-to-film seals.

Film-to-film heat seal closures are formed by placing the film between opposing heat seal jaws that apply pressure and also apply heat above the seal initiation temperature of the film. The heat seal closures made are often the strongest after the seal has cooled to ambient temperature. In order to increase production capacity, the packages are filled with product before the heat seal has time to completely cool. Thus, it is necessary for the heat seal closure to provide sufficient strength very rapidly without the need for cooling the package to ambient temperature. Otherwise, the heat seal closure will be compromised resulting in reject product, waste, and added expense.

Moreover, films used in retort packages need to form heat seals that can withstand elevated temperature required for sterilization. Retort packages are typically exposed to temperatures greater than 121° C., or greater than 130° C., for an extended period in order to sterilize the contents therein.

The art therefore recognizes the continuous need to develop improved films for FFS applications. In particular, a need exists for films having a low heat seal initiation temperature and a strong hot tack strength over a broad temperature range in order to increase production efficiency for packaging procedures, such as FFS procedures. A further need exists for films having high temperature seal strength in addition to the aforementioned film properties.

SUMMARY

The present disclosure provides a polymeric composition and films produced from the same. When formed into a film (or a film layer), the present polymeric composition exhibits (i) low heat seal initiation temperature, (ii) strong hot tack strength over a broad temperature window, and (iii) high hot tack strength. In addition the film composed of the present polymeric composition has high temperature seal strength suitable for use as film in retort packaging.

The present disclosure provides a polymeric composition. In an embodiment, a polymeric composition is provided and includes:
(A) a propylene/α-olefin interpolymer;
(B) an ethylene-based polymer;
(C) a block composite comprising:
i) a propylene-based crystalline polymer;
ii) an ethylene/α-olefin polymer; and
iii) a block copolymer comprising a propylene-based crystalline block and an ethylene/α-olefin block.

The present disclosure provides a film. In an embodiment, a film is provided and includes at least one layer formed from a polymeric composition comprising:
(A) a propylene/α-olefin interpolymer;
(B) an ethylene-based polymer;
(C) a block composite comprising:
i) a propylene-based crystalline polymer;
ii) an ethylene/α-olefin polymer; and
iii) a block copolymer comprising a propylene-based crystalline block and an ethylene/α-olefin block.

In an embodiment, the film includes a second layer. The second layer is composed of an olefin-based polymer.

The present disclosure provides an article. In an embodiment a retort pouch is provided and includes a first layer, a second layer, and an optional third layer. The first layer is composed of a polymer composition comprising:
(A) a propylene/α-olefin interpolymer;
(B) an ethylene-based polymer;
(C) a block composite comprising:
i) a propylene-based crystalline polymer;
ii) an ethylene/α-olefin polymer; and
iii) a block copolymer comprising a propylene-based crystalline block and an ethylene/α-olefin block.

In an embodiment, the second layer may be composed of an olefin-based polymer.

An advantage of the present disclosure is an improved polymeric composition that provides improved heat seal properties when formed into a film or a film layer such as low heat seal initiation temperature, and/or strong hot tack strength over a broad temperature window, and/or high hot tack strength.

An advantage of the present disclosure is an improved film for heat sealing applications.

DETAILED DESCRIPTION

1. Composition

Figure 1:
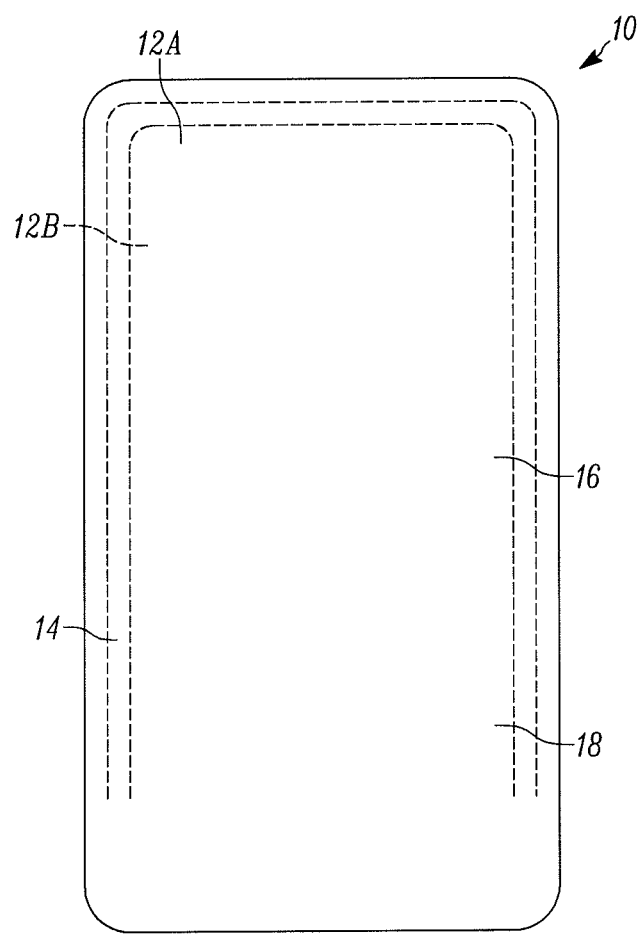
FIG. 1 is a plan view of a retort pouch in accordance with an embodiment of the present disclosure.

The present disclosure provides a polymeric composition. In an embodiment, a polymeric composition is provided and includes:
(A) a propylene/α-olefin interpolymer;
(B) an ethylene-based polymer; and (C) a block composite comprising:
(i) a propylene-based crystalline polymer;
(ii) an ethylene/α-olefin polymer; and
(iii) a block copolymer comprising a propylene-based crystalline block and an ethylene/α-olefin block.

The polymeric composition may optionally include (D) an olefin-based polymer and/or (E) additives. In an embodiment, the polymeric composition contains from 50 wt % to 95 wt % component (A), 1 wt % to 30 wt % component (B), and 1 wt % to 30 wt % component (C). Weight percent is based on total weight of the composition. It is understood that the amount for each component (A)-(E) can be adjusted to yield a 100 wt % polymeric composition.

(A) Propylene/α-Olefin Interpolymer

The present composition contains a propylene/α-olefin interpolymer component (A). The propylene/α-olefin interpolymer is a propylene-based polymer. For purposes of this disclosure ethylene is considered an α-olefin. Nonlimiting examples of suitable comonomers include ethylene, $C_{4-20}$ α-olefins, such as 1-butene, 1-pentene, 1-hexene, 4-methyl-1-pentene, 1-heptene, 1-octene, 1-decene, 1-dodecene, 1-tetradecene, 1-hexadecene, and 1-octadecene; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene. The α-olefins can also contain a cyclic structure such as cyclohexane or cyclopentane, resulting in an α-olefin such as 3-cyclohexyl-1-propene (allyl cyclohexane) and vinyl cyclohexane.

In an embodiment the propylene/α-olefin interpolymer is a propylene/ethylene copolymer. The propylene/ethylene copolymer contains from 1 wt % to 40 wt % units derived from ethylene (based on total weight of the propylene/ethylene copolymer). In a further embodiment, the propylene/ethylene copolymer has a density from 0.86 g/cc to 0.90 g/cc, and/or a melt flow rate (MFR) from 0.5 g/10 min to 10 g/min, and/or a total crystallinity from 10% to 40%, and/or a melting temperature (Tm) from 70° C., or 80° C. to 90° C., or 95° C. Nonlimiting examples of suitable propylene/ethylene copolymer are propylene/ethylene copolymer sold under the tradename VERSIFY (such as VERSIFY 2200 and VERSIFY 3200) available from The Dow Chemical Company, Midland, Mich., and propylene/ethylene copolymer sold under the tradename VISTAMAXX available from the ExxonMobil Corporation, Irving, Tex.

In an embodiment, the propylene/ethylene copolymer has a density from 0.86 g/cc to 0.89 g/cc, and/or an MFR from 1 g/10 min to 3 g/10 min, and/or total crystallinity from 20 wt % to 25 wt %, and/or a Tm from 80° C. to 85° C.

In an embodiment, the propylene/ethylene copolymer has a density from 0.86 g/cc to 0.88 g/cc, and/or an MFR from 5 g/10 min to 10 g/10 min, and/or total crystallinity from 25% to 35%, and/or a Tm from 80° C. to 90° C.

In an embodiment, the propylene/ethylene copolymer is a single phase propylene/ethylene copolymer. In other words, the propylene/ethylene copolymer excludes heterophasic copolymers such as propylene impact copolymer.

In an embodiment, the propylene/α-olefin interpolymer has a molecular weight distribution (MWD) from 2.0, or 2.5 to 4.0 to 3.5. In a further embodiment, the propylene/α-olefin interpolymer is a propylene/ethylene copolymer with an MWD from 2.0, or 2.5 to 4.0 to 3.5.

The propylene-based polymer may comprise two or more embodiments disclosed herein.

(B) Ethylene-Based Polymer

The present polymeric composition contains an ethylene-based polymer, component (B). The ethylene-based polymer may be an ethylene homopolymer or an ethylene copolymer. The comonomer may be α-olefin such as a $C_{3-20}$ linear, branched or cyclic α-olefin. Nonlimiting examples of suitable $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this disclosure certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this disclosure. Illustrative ethylene polymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

In an embodiment, the ethylene-based polymer is a high density polyethylene. As used herein, the term "high density polyethylene (or "HDPE") is an ethylene-based polymer having a density greater than or equal to 0.941 g/cc. A nonlimiting example of a suitable HDPE is 12450N available from the Dow Chemical Company, Midland, Mich.

In an embodiment, the HDPE has a density from 0.941 g/cc to 0.970 g/cc, and/or a crystallinity of at least 55%, and/or a melting temperature of at least 125° C., and/or a melt index (MI) from 1.0 g/10 min to 20.0 g/10 min.

In an embodiment, the HDPE has a density of 0.950 g/cc and a melt index of 12.0 g/10 min.

As used herein, the "sum weight" is the combined weight of component (A) plus the weight of component (B). The sum weight is a metric by which to evaluate component (A) with respect to component (B) and vice versa. In other words, the sum weight excludes component (C) and optional components (D) and (E). In an embodiment, the sum weight contains greater than 50 wt %, or greater than 60 wt %, or greater than 70 wt % of component (A).

The ethylene-based polymer may comprise two or more embodiments disclosed herein.

(C) Block Composite

The present polymeric composition contains a block composite. The block composite includes:
(i) a propylene-based crystalline polymer;
(ii) an ethylene/α-olefin-based polymer; and
(iii) a block copolymer comprising a propylene-based crystalline block and an ethylene/α-olefin block.

The term "block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the present disclosure are characterized by unique distributions of both polymer polydispersity (PDI or Mw/Mn), block length distribution, and/or block number distribution, due, in a preferred embodiment, to the effect of the shuttling agent(s) in combination with the catalyst(s).

A "block composite" is a novel polymer comprising a soft copolymer, a hard polymer and a block copolymer having a soft segment and a hard segment, wherein the hard segment of the block copolymer is the same composition as the hard polymer in the block composite and the soft segment of the block copolymer is the same composition as the soft copolymer of the block composite. The block copolymer can be linear or branched. More specifically, when produced in a continuous process, the block composite desirably possesses PDI from 1.7 to 15, or from 1.8 to 3.5, or 1.8 to 2.2, or 1.8 to 2.1. When produced in a batch or semi-batch process, the block composite possesses PDI from 1.0 to 2.9, or from 1.3 to 2.5, or from 1.4 to 2.0, or from 1.4 to 1.8.

"Hard" segments refer to highly crystalline blocks of polymerized units in which the monomer is present in an amount greater than 95 weight percent, and preferably greater than 98 weight percent. In other words, the comonomer content in the hard segments is less than 5 weight percent, and preferably less than 2 weight percent. In some embodiments, the hard segments comprise all or substantially all propylene units. "Soft" segments, on the other hand, refer to amorphous, substantially amorphous or elastomeric blocks of polymerized units in which the comonomer content is greater than 10 mol %.

(i) Block Composite Index

The present examples (Table 3, 4) show that the insoluble fractions contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$\text{Wt \% } C_{2_{Overall}} = w_{Insoluble}(\text{wt \% } C_{2_{Insoluble}}) + w_{soluble}(\text{wt \% } C_{2_{soluble}}) \quad \text{Eq. 1}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$\text{Wt \% } C_{2_{Overall\ or\ xyleneinsoluble}} = \quad \text{Eq. 2}$$
$$w_{iPPHard}(\text{wt \% } C_{2_{iPP}}) + w_{EP\ soft}(\text{wt \% } C_{2_{EPsoft}})$$

$$w_{iPPhard} = \frac{\text{wt \% } C_{2_{overall\ or\ xyleneinsoluble}} - \text{wt \% } C_{2_{EPsoft}}}{\text{wt \% } C_{2_{iPPhard}} - \text{wt \% } C_{2_{EPsoft}}} \quad \text{Eq. 3}$$

$$w_{EPsoft} = 1 - w_{iPPHard} \quad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. Refer to Table 3 for the estimated ratio of iPP and EP present in the diblock copolymer for all the runs. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

For example, if an inventive block composite (C) composed of iPP (C)(i), EP (C)(ii) and iPP-EP di-block (C)(iii) contains an overall of 47 wt % $C_2$ and is made under the conditions to produce an EP soft polymer with 67 wt % $C_2$ and an iPP homopolymer containing zero ethylene, the amount of EP soft and iPP hard is 70 wt % and 30 wt %, respectively (as calculated using Equations 3 and 4). If the percent of EP is 70 wt % and the iPP is 30 wt %, the relative ratio of the EP:iPP blocks could be expressed as 2.33:1.

Hence, if one skilled in the art, carries out a xylene extraction of the polymer and recovers 40 wt % insoluble and 60 wt % soluble, this would be an unexpected result and this would lead to the conclusion that a fraction of inventive block copolymer was present. If the ethylene content of the insoluble fraction is subsequently measured to be 25 wt % $C_2$, Equations 2 thru 4 can be solved to account for this additional ethylene and result in 37.3 wt % EP soft polymer and 62.7 wt % iPP hard polymer.

Since the insoluble fraction contains 37.3 wt % EP copolymer, it should be attached to an additional 16 wt % of iPP polymer based on the EP:iPP block ratio of 2.33:1. This brings the estimated amount of diblock in the insoluble fraction to be 53.3 wt %. For the entire polymer (unfractionated), the composition is described as 21.3 wt % iPP-EP Diblock, 18.7 wt % iPP polymer, and 60 wt % EP polymer. As the compositions of these polymers are novel, the term "block composite index" (or "BCI") is herein defined to equal the weight percentage of diblock divided by 100% (i.e. weight fraction). The value of the block composite index can range from 0 to 1, wherein 1 would be equal to 100% inventive diblock and zero would be for a material such as a traditional blend or random copolymer. For the example described above, the block composite index for the block composite is 0.213. For the insoluble fraction, the BCI is 0.533, and for the soluble fraction the BCI is assigned a value of zero.

Depending on the estimations made of the total polymer composition and the error in the analytical measurements which are used to estimate the composition of the hard and soft blocks, between 5 to 10% error is possible in the computed value of the block composite index. Such estimations include the wt % C2 in the iPP hard block as measured from the DSC melting point, NMR analysis, or process condition; the average wt % C2 in the soft block as estimated from the composition of the xylene solubles, or by NMR, or by DSC melting point of the soft block (if detected). But overall, the block composite index calculation reasonably accounts for the unexpected amount of 'additional' ethylene present in the insoluble fraction, the only way to have an EP copolymer present in the insoluble fraction, the EP polymer chain must be connected to an iPP polymer block (or else it would have been extracted into the xylene soluble fraction).

The block composite polymers of the present disclosure are prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions.

In an embodiment, the block composite comprises a fraction of block polymer which possesses a most probable distribution of block lengths. Preferred polymers according to the present disclosure are block copolymers containing 2 or 3 blocks or segments. In a polymer containing three or more segments (that is blocks separated by a distinguishable block) each block may be the same or chemically different and generally characterized by a distribution of properties. In a process for making the polymers, chain shuttling is used as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer comprises two, three, or more, preferably two or three, differentiated polymer segments arranged intramolecularly.

The following mathematical treatment of the resulting polymers is based on theoretically derived parameters that are believed to apply and demonstrate that, especially in two or more steady-state, continuous reactors or zones connected in series, having differing polymerization conditions to which the growing polymer is exposed, the block lengths of the polymer being formed in each reactor or zone will conform to a most probable distribution, derived in the following manner, wherein pi is the probability of polymer propagation in a reactor with respect to block sequences from catalyst i. The theoretical treatment is based on standard assumptions and methods known in the art and used in predicting the effects of polymerization kinetics on molecular architecture, including the use of mass action reaction rate expressions that are not affected by chain or block lengths, and the assumption that polymer chain growth is completed in a very short time compared to the mean reactor residence time. Such methods have been previously disclosed in W. H. Ray, J. Macromol. Sci., Rev. Macromol. Chem., C8, 1 (1972) and A. E. Hamielec and J. F. MacGregor, "Polymer Reaction Engineering", K. H. Reichert and W. Geisler, Eds., Hanser, Munich, 1983. In addition, it is assumed that each incidence of the chain shuttling reaction in a given reactor results in the formation of a single polymer block, whereas transfer of the chain shuttling agent terminated polymer to a different reactor or zone and exposure to different polymerization conditions results in formation of a different block. For catalyst i, the fraction of sequences of length n being produced in a reactor is given by Xi[n], where n is an integer from 1 to infinity representing the total number of monomer units in the block.

$$Xi[n] = (1-pi)pi(n-1) \quad \text{most probable distribution of block lengths}$$

$$Ni = \frac{1}{1-pi} \quad \text{number average block length}$$

If more than one catalyst is present in a reactor or zone, each catalyst has a probability of propagation (pi) and therefore has a unique average block length and distribution for polymer being made in that reactor or zone. In a most preferred embodiment the probability of propagation is defined as:

$$pi = \frac{Rp[i]}{Rp[i]+Rt[i]+Rs[i]+[Ci]} \quad \text{for each catalyst } i=\{1,2\ldots\},$$

where,
Rp[i]=Local rate of monomer consumption by catalyst i, (moles/L/time),
Rt[i]=Total rate of chain transfer and termination for catalyst i, (moles/L/time), and
Rs[i]=Local rate of chain shuttling with dormant polymer, (moles/L/time).

For a given reactor the polymer propagation rate, Rp[i], is defined using an apparent rate constant, $\overline{kpi}$, multiplied by a total monomer concentration, [M], and multiplied by the local concentration of catalyst i, [Ci], as follows:

$$Rp[i]=\overline{kpi}[M][Ci]$$

The chain transfer, termination, and shuttling rate is determined as a function of chain transfer to hydrogen (H2), beta hydride elimination, and chain transfer to chain shuttling agent (CSA). The quantities [H2] and [CSA] are molar concentrations and each subscripted k value is a rate constant for the reactor or zone:

$$Rt[i]=kH2i[H2][Ci]+k\beta i[Ci]+kai[CSA][Ci]$$

Dormant polymer chains are created when a polymer moiety transfers to a CSA and all CSA moieties that react are assumed to each be paired with a dormant polymer chain. The rate of chain shuttling of dormant polymer with catalyst i is given as follows, where [CSAf] is the feed concentration of CSA, and the quantity ([CSAf]−[CSA]) represents the concentration of dormant polymer chains:

$$Rs[i]=kai[Ci]([CSAf]-[CSA])$$

As a result of the foregoing theoretical treatment, it may be seen that the overall block length distribution for each block of the resulting block copolymer is a sum of the block length distribution given previously by Xi[n], weighted by the local polymer production rate for catalyst i. This means that a polymer made under at least two different polymer forming conditions will have at least two distinguishable blocks or segments each possessing a most probable block length distribution.

Suitable catalysts and catalyst precursors to produce the block composite (C) include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/0311812; U.S. Pat. No. 7,355,089 B2; or WO 2009/012215, which are herein incorporated by reference with respect to catalysts. Suitable co-catalysts are those disclosed in WO2005/090426, in particular, those disclosed on page 54, line 1 to page 60, line 12, which is herein incorporated by reference. Suitable chain shuttling agents are those disclosed in WO2005/090426, in particular, those disclosed on page 19, line 21 through page 20 line 12, which is herein incorporated by reference. Particularly preferred chain shuttling agents are dialkyl zinc compounds.

The block polymers of the block composite comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one ore more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds.

Comonomer content in the resulting block composite polymers may be measured using any suitable technique, with techniques based on nuclear magnetic resonance (NMR) spectroscopy preferred. It is highly desirable that some or all of the polymer blocks comprise amorphous or relatively amorphous polymers such as copolymers of propylene, 1-butene or 4-methyl-1-pentene and a comonomer, especially random copolymers of propylene, 1-butene or 4-methyl-1-pentene with ethylene, and any remaining polymer blocks (hard segments), if any, predominantly comprise propylene, 1-butene or 4-methyl-1-pentene in polymerized form. Preferably such segments are highly crystalline or stereospecific polypropylene, polybutene or poly-4-methyl-1-pentene, especially isotactic homopolymers.

Further preferably, the block copolymers of the present disclosure comprise from 10 to 90 percent crystalline or relatively hard segments and 90 to 10 percent amorphous or relatively amorphous segments (soft segments), preferably from 20 to 80 percent crystalline or relatively hard segments and 80 to 20 percent amorphous or relatively amorphous segments (soft segments), most preferably from 30 to 70 percent crystalline or relatively hard segments and 70 to 30 percent amorphous or relatively amorphous segments (soft segments). Within the soft segments, the mole percent comonomer may range from 10 to 90 mole percent, preferably from 20 to 80 mole percent, and most preferably from 33 to 75 mol % percent. In the case wherein the comonomer is ethylene, it is preferably present in an amount of 10 mol % to 90 mol %, more preferably from 20 mol % to 80 mol %, and most preferably from 33 mol % to 75 mol % percent. Preferably, the copolymers comprise hard segments that are 90 mol % to 100 mol % propylene. The hard segments can be greater than 90 mol % preferably greater than 93 mol % and more preferably greater than 95 mol % propylene, and most preferably greater than 98 mol % propylene. Such hard segments have corresponding melting points that are 80° C. and above, preferably 100° C. and above, more preferably 115° C. and above, and most preferably 120° C. and above. Preferably, the block copolymers of the present disclosure comprise from 10 to 90 percent crystalline or relatively hard segments and 90 to 10 percent amorphous or relatively amorphous segments (soft segments). Within the soft segments, the mole percent comonomer may range from 5 to 90 mole percent, preferably from 10 to 60 mole percent. In the case wherein the comonomer is ethylene, it is preferably present in an amount of 10 wt % to 75 wt %, more preferably from 30 wt % to 70 wt %.

Preferably, the copolymers comprise hard segments that are 80 wt % to 100 wt % propylene. The hard segments can be greater than 90 wt %, preferably greater than 95 wt % and more preferably greater than 98 wt % propylene.

The block composite polymers of the present disclosure may be differentiated from conventional, random copolymers, physical blends of polymers, and block copolymers prepared via sequential monomer addition. The block composites may be differentiated from random copolymers by characteristics such as higher melting temperatures for a comparable amount of comonomer, block index and block composite index, as described below; from a physical blend by characteristics such as block index, block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity.

In some embodiments, the block composites of the present disclosure have a Block Composite Index (BCI), as defined below, that is greater than zero but less than about 0.4 or from about 0.1 to about 0.3. In other embodiments, BCI is greater than about 0.4 and up to about 1.0. Additionally, the BCI can be in the range of from about 0.4 to about 0.7, from about 0.5 to about 0.7, or from about 0.6 to about 0.9. In some embodiments, BCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, BCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Other desirable compositions according to the present disclosure are elastomeric block copolymers of propylene, 1-butene or 4-methyl-1-pentene with ethylene, and optionally one or more α-olefins or diene monomers. Preferred α-olefins for use in this embodiment of the present disclosure are designated by the formula $CH_2=CHR^*$, where $R^*$ is a linear or branched alkyl group of from 1 to 12 carbon atoms. Examples of suitable α-olefins include, but are not limited to isobutylene, 1-butene, 1-pentene, 1-hexene, 4-methyl-1-pentene (when copolymerized with propylene), and 1-octene. Suitable dienes for use in preparing such polymers, especially multi-block EPDM type polymers include conjugated or non-conjugated, straight or branched chain-, cyclic- or polycyclic-dienes containing from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene. The resulting product may comprise isotactic homopolymer segments alternating with elastomeric copolymer segments, made in situ during the polymerization. Preferably, the product may be comprised solely of the elastomeric block copolymer of propylene, 1-butene or 4-methyl-1-pentene with one or more comonomers, especially ethylene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In an embodiment, the block composite has weight average molecular weight (Mw) from 10,000 to about 2,500,000, preferably from 35000 to about 1,000,000 and more preferably from 50,000 to about 300,000, preferably from 50,000 to about 200,000. The block composite (C) is disclosed in co-pending U.S. patent application No. 61/248,160 filed on Oct. 2, 2009, the entire content of which is incorporated herein by reference.

(ii) Crystalline Block Composite

The block composite (C) can be a crystalline block composite. The term "crystalline block composite" (CBC) refers to a novel polymer comprising a crystalline ethylene based polymer (CEP), a crystalline alpha-olefin based polymer (CAOP), and a block copolymer having a crystalline ethylene block (CEB) and a crystalline alpha-olefin block (CAOB), wherein the CEB of the block copolymer is essentially the same composition as the CEP in the block composite and the CAOB of the block copolymer is essentially the same composition as the CAOP of the block composite. The block copolymers can be linear or branched. More specifically, each of the respective block segments can contain long chain branches of composition similar to the respective block, but the block copolymer segment is substantially linear as opposed to containing grafted or branched blocks. When produced in a continuous process, the crystalline block composites desirably possess PDI from 1.7 to 15, preferably from 1.8 to 5, more preferably from 1.8 to 3.5, and most preferably from 1.8 to 2.5.

CAOB refers to highly crystalline blocks of polymerized alpha olefin units in which the monomer is present in an amount greater than 90 mol %, preferably greater than 93 mol percent, more preferably greater than 95 mol percent, and preferably greater than 96 mol percent. In other words, the comonomer content in the CAOBs is less than 10 mol percent, and preferably less than 7 mol percent, and more preferably less than 5 mol percent, and most preferably less than 4 mol %. Such CAOBs have corresponding melting points that are 80° C. and above, preferably 100° C. and above, more preferably 115° C. and above, and most preferably 120° C. and above. In some embodiments, the CAOB comprise all or substantially all propylene units. CEB, on the other hand, refers to blocks of polymerized ethylene units in which the comonomer content is 10 mol % or less, preferably between 0 mol % and 10 mol %, more preferably between 0 mol % and 7 mol % and most preferably between 0 mol % and 5 mol %. Such CEB have corresponding melting points that are preferably 75° C. and above, more preferably 90° C., and 100° C. and above.

Preferably the crystalline block composite polymers of the present disclosure comprise from 0.5 to 94 wt % CEP, from 0.5 to 94 wt % CAOP and from 5 to 99 wt % block copolymer. More preferably, the crystalline block composite polymers comprise from 0.5 to 79 wt % CEP, from 0.5 to 79 wt % CAOP and from 20 to 99 wt % block copolymer and more preferably from 0.5 to 49 wt % CEP, from 0.5 to 49 wt % CAOP and from 50 to 99 wt % block copolymer.

Preferably, the block copolymers of the present disclosure comprise from 5 to 95 wt percent crystalline ethylene blocks (CEB) and 95 to 5 percent crystalline alpha-olefin blocks (CAOB). They may comprise 10 wt % to 90 wt % CEB and 90 wt % to 10 wt % CAOB. More preferably, the block copolymers comprise 25 to 75 wt % CEB and 75 to 25 wt % CAOB, and even more preferably they comprise 30 to 70% CEB and 70 to 30 wt % CAOB.

In some embodiments, the block composites of the present disclosure have a Crystalline Block Composite Index (CBCI), as defined below, that is greater than zero but less than about 0.4 or from about 0.1 to about 0.3. In other embodiments, CBCI is greater than about 0.4 and up to about 1.0. Additionally, the CBCI can be in the range of from about 0.4 to about 0.7, from about 0.5 to about 0.7, or from about 0.6 to about 0.9. In some embodiments, CBCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, CBCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Further preferably, the crystalline block composites of this embodiment of the present disclosure have a weight average molecular weight (Mw) of 1,000 to about 2,500,000, preferably of 35000 to about 1,000,000 and more preferably of 50,000 to 500,000, of 50,000 to about 300,000, and preferably from 50,000 to about 200,000. The crystalline block composite and the crystalline block composite index (CBCI) calculation are disclosed in co-pending U.S. patent application No. 61/356,978 filed on Jun. 21, 2010, the entire content of which is incorporated herein by reference.

In an embodiment, the block composite (C) includes isotactic crystalline propylene homopolymer, or iPP (C)(i), ethylene/propylene copolymer, or EP, (C)(ii) and the block copolymer (C)(iii). The block copolymer subcomponent (C)(iii) includes a diblock with the formula (1) below.

$$(EP)-(iPP) \tag{1}$$

The term "EP" represents a segment of polymerized ethylene and propylene monomeric units. The term "iPP" represents a segment of isotactic propylene homopolymer or a segment of substantially isotactic propylene homopolymer with minimal (<1%) atactic or syndiotactic defects.

In an embodiment, the block composite (C) has an ethylene content greater than 20 wt %, or greater than 30 wt %, or greater than 35 wt %. The weight percent ethylene is based on the total weight of the block composite (C).

In an embodiment, component (C)(iii) is present in an amount from greater than 15 wt %, or greater than 20 wt %, or greater than 25 wt %, or greater than 30 wt %, or greater than 50 wt % to about 80 wt % based on the total weight of component (C).

In an embodiment, the block composite (Component C) has a density from 0.865 to 0.90 g/cc, or 0.897 g/cc and/or a melt index (I2) from 1 to 50 g/10 min.

In an embodiment, the block composite (C) has a melt index from about 1, or about 2, or about 3, or about 4, or about 5, or about 6 to about 40, or about 35, or about 20, or about 15, or about 13.

In an embodiment, the block composite (C) has an I10/I2 from about 6, or about 7, or about 8 to about 20, or about 19, or about 17, or about 15, or about 13, or about 12, or about 11.

D. Olefin-Based Polymer

The present polymeric composition may optionally include an olefin-based polymer. Nonlimiting examples of suitable olefin based polymers include propylene-based polymer and ethylene-based polymer. Nonlimiting examples of suitable ethylene-based polymer include linear low density polyethylene (LLDPE), low density polyethylene (LDPE), HDPE, homogeneously branched polyethylene (nonlimiting examples include polymers sold under the tradename EXXACT from ExxonMobil and under the tradename TAFMER from Mitsui) substantially linear ethylene polymer (nonlimiting examples include polymers sold under the tradename AFFINTY and ENGAGE from The Dow Chemical Company), functionalized olefin-based polymer, and any combination thereof.

Substantially linear ethylene/α-olefin interpolymer (SLEP) is a homogeneously branched polymer and is described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

Some polymers may be substituted with 0.01 long chain branches per 1000 total carbons to 3 long chain branch per 1000 total carbons, more preferably from 0.05 long chain branches per 1000 total carbons to 2 long chain branch per 1000 total carbons, and especially from 0.3 long chain branches per 1000 total carbons to 1 long chain branch per 1000 total carbons.

The substantially linear ethylene/α-olefin interpolymers form a unique class of homogeneously branched ethylene polymers. They differ substantially from the well-known class of conventional, homogeneously branched linear ethylene/α-olefin interpolymers, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the present disclosure have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al.; in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17,1301(1949) and Rudin, A., Modern Methods of Polymer Characterization, John Wiley & Sons, New York (1991) pp. 103-112.

The olefin-based polymer may include a functionalized olefin-based polymer. Nonlimiting examples of suitable functionalized olefin-based polymer include maleic anhydride grafted polyethylene, maleic anhydride grafted polypropylene, ethylene acrylic acid copolymer, ethylene methacrylate copolymer, and any combination thereof.

E. Additives

The present polymeric composition may optionally comprise one or more additives. Known additives may be incorporated into the resin composition so long as the objects of the disclosure are not compromised. Nonlimiting examples of such additives include nucleating agents, antioxidants, acid scavengers, heat stabilizers, light stabilizers, ultraviolet light absorbers, lubricants, antistatic agents, pigments, dyes, dispersing agents, inhibitors, neutralizing agents, foaming agents, plasticizers, flowability improvers, anti-blocking agents, slip additives, and weld strength improvers.

The above-mentioned additives may be employed in any combination and may each be contained in the respective polymer compositions in amounts of 0.0001 to 10 percent (or any individual value or subrange therein) or in an amount from 0.001 to 1.0 percent.

The polymeric composition may comprise two or more embodiments disclosed herein.

2. Film

The present disclosure provides films comprising the present polymeric composition. In other words, the present polymeric composition may be formed into a film. In an embodiment, a film is provided and includes:

(A) from 50 wt % to 95 wt % of the propylene/α-olefin interpolymer;

(B) from 1 wt % to 30 wt % of the ethylene-based polymer; and (C) from 1 wt % to 30 wt % of the block composite.

The film may optionally include olefin-based polymer (D) and/or additives (E). The components (A)-(E) may be any respective component (A)-(E) as disclosed above for the polymeric composition. In an embodiment, the film contains from 70 wt % to 80 wt % Component (A), from 10 wt % to 20 wt % Component (B) and from 5 wt % to 15 wt % Component (C). Weight percent is based on total weight of the film. The film exhibits one, some, or all of the following properties set forth in Table 1 below.

TABLE 1

Film Properties

| Property | Unit | Range |
|---|---|---|
| Film thickness | mil | 0.3 to 5 |
| Kinetic coefficient of friction (F-F) | | 0.15 to 1.2 |
| Static coefficient of friction (F-F) | | 0.15 to 1.2 |
| Haze | % | 0.5 to 15 |
| Clarity | % | 80 to 99.5 |
| Peak hot tack | N/in | 3 to 18 |
| Hot tack initiation temperature (HTIT) | °C. | 70-150 |
| Peak hot tack temperature | °C. | 60 to 140 |
| Hot tack temperature window | °C. | broader than 50° C., or broader than 55° C., |
| Hot tack strength at 150° C. | N/in | 1 to 8 |

A low coefficient of friction (COF) is desirable for enhanced processing and/or faster packaging speed. The coefficient of friction in Table 1 above is film-to-film coefficient of friction. A broad hot tack temperature window is advantageous for (i) lower seal initiation temperatures (ii) enhanced seal stability at retort temperatures (120° C. to 130° C.) and (iii) faster processing speeds. A high hot tack strength at 150° C. is advantageous for retort applications.

Applicant has discovered a film with the following desirable combination of properties: low COF, a broad hot tack temperature window, low hot tack initiation temperature, and a high hot tack strength at elevated temperature.

In addition the present film has desirable optical properties: low haze and high clarity.

In an embodiment, the film has a hot tack initiation temperature (HTIT) less than 80° C., or less than 75° C.

The present film can be a monolayer film. The present polymeric composition can be formed into one or more layers in a multi-layer film. The structure of the mono-/multi-layer film may be laminated, extruded (cast/sheet), coextruded (cast/sheet), oriented (axially, biaxially, tenter frame, bubble, double bubble, trapped bubble), and combinations thereof.

In an embodiment, the present film is crosslink-free. As used herein, a film is "crosslink-free," when the film has a gel content less than 5% as measured in accordance with ASTM D-2765-84 Method A.

In an embodiment, the film has a thickness from about 0.3 mile to about 5.0 mil, or about 3.5 mil.

(A) Multi-Layer Film

The present disclosure provides a multi-layer film. In an embodiment, a multi-layer film is provided and includes a first layer, a second layer, and an optional third layer. The first layer includes:

(A) 50 wt % to 95 wt % of the propylene/α-olefin interpolymer,
(B) 1 wt % to 30 wt % of the ethylene-based polymer, and
(C) 1 wt % to 30 wt % of the block composite.

Weight percent is based on total weight of the first layer. Components (A), (B), and (C) may be any respective component (A)-(C) as disclosed for the present polymeric composition. In an embodiment, first layer component (A) includes a propylene/ethylene copolymer with a density from 0.89 g/cc to 0.92 g/cc and/or from 1 mol % to 12 mol % units derived from ethylene. The first layer may include optional components (D) and (E).

In an embodiment, first layer component (B) is an HDPE having a density greater than 0.941 g/cc and/or a melt index from 1.0 g/10 min to 20.0 g/10 min.

In an embodiment, the first layer of the multi-layer film component (C) comprises (i) iPP, (ii) ethylene/propylene copolymer, and (iii) a di-block copolymer comprising iPP-block and ethylene/propylene-block. The density of the block composition (C) is from 0.87 g/cc, or 0.875 g/cc to 0.915 g/cc, or 0.92 g/cc.

In an embodiment, the second layer of the multi-layer film is composed of an olefin-based polymer. Nonlimiting examples of suitable olefin-based polymer include LLDPE, LDPE, homogeneously branched polyethylene, SLEP, HDPE, propylene-based polymer, and any combination thereof.

In an embodiment, the second layer includes 70 wt % to 99 wt % olefin-based polymer and 30 wt % to 1 wt % functionalized olefin-based polymer. Nonlimiting examples of suitable functionalized olefin-based polymer include maleic anhydride grafted polyethylene, maleic anhydride grafted polypropylene, ethylene acrylic acid copolymer, ethylene methacrylate copolymer, and any combination thereof. Weight percent is based on the total weight of the second layer.

The optional third layer includes a material selected from nylon, polyethylene terephthalate (PET), polypropylene, and any combination thereof.

In an embodiment, the multilayer film is a three-layer film. The first layer is a sealant layer (containing the present polymeric composition), the second layer is a core layer (containing olefin-based polymer), and the third layer is a backing layer (containing nylon, PET, and/or polypropylene). The sealant layer is an innermost layer. The second layer is a core layer. A "core layer" is a layer located between at least two other layers. In other words, a core layer is not an innermost layer or an outermost layer. The backing layer is an outermost layer.

In an embodiment, the three-layer film has a thickness from 0.3 mil, or 0.5 mil to 3 mil, or 5 mil.

The present film may comprise two or more embodiments as disclosed herein.

3. Articles

The present disclosure provides articles comprising at least one component formed from the present polymeric composition. In other words, the present polymeric composition may be formed into articles. The present polymeric composition and/or the present film may be formed into a finished article of manufacture by any one of a number of conventional processes and apparatus. Illustrative processes include, but are not limited to, extrusion, calendaring, injection molding, and/or compression molding. For example, articles can be prepared by injection molding, extrusion, extrusion followed by thermoforming, low pressure molding, compression molding, and the like. Nonlimiting examples of suitable articles include extruded profiles (single layer or multi-layer films), foams, weather strips, belts, hoses, wire and cable jacketing, tubes, flooring materials, gaskets, molded goods, sheets, and extruded parts. Additional articles include automotive parts (for example, dashboards and window seals), computer parts, building materials, household appliances, toys, footwear components, label stocks, paper carton such as milk carton, sachets, bags, pouches, sausage and/or meat wrap or sealed bags, dry food packages such as cereal, sugar, flour, etc., thermoformed multilayer films, thermoformed containers, blister packages, and pharmaceutical package films.

(A) Retort Pouch

In an embodiment, the article is a flexible container containing the present polymeric composition. Referring to the drawings, and initially to FIG. 1, one form of article is a retort pouch and is shown and indicated generally by the reference numeral 10. As used herein, "a retort pouch" is a flexible package that can remain airtight and sealed after exposure to temperatures from 120° C.-135° C. and pressure up to 500 kPa for 30-80 minutes. The retort pouch 10 includes two sheets 12A and 12B of multi-layer film, joined and sealed together about their respective peripheries by a heat seal 14. The heat seal 14 may extend along the entire common periphery of sheets 12A, 12B. Alternatively, the heat seal 14 may extend along a portion of the common periphery of sheets 12A, 12B. A storage space 16 is defined by the area between the two sheets 12A, 12B and within the heat seal 14. The storage space 16 is sealed off from the surrounding environment and contains the contents 18, of the retort pouch, for example, foodstuffs. While the package is described as having two sheets 12A, 12B, it is understood that a single sheet could be used. The single sheet could be folded upon itself to form the two layers. The three unconnected edges would then be heat sealed after the contents are placed between the folded-over layers.

Figure 2:
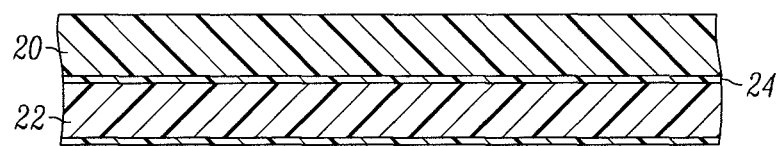
FIG. 2 is an elevation view of a multi-layer film in accordance with an embodiment of the present disclosure.

The sheets 12A, 12B of the retort pouch 10 can be manufactured from a 2-layer film structure as shown in FIG. 2. An outer layer 20 is furthest away from the package contents 18. In an embodiment, the outer layer corresponds to the second layer of the previously-described film.

A sealant layer 22 is immediately adjacent to the outer layer 20. The sealant layer 22 (or the innermost layer, or the retort pouch content contact layer) is composed of the present polymeric composition. Outer layer 20 and sealant layer 22 may be coextruded directly to each other. Alternatively an adhesive layer 24 may bond outer layer 20 to sealant layer 22 as shown in FIG. 2. Film-to-film contact under heat and pressure of opposing sealant layers 24 form heat seal 14.

In an embodiment, the retort pouch 10 is wrinkle-free, or substantially wrinkle-free, post retort.

Figure 3:
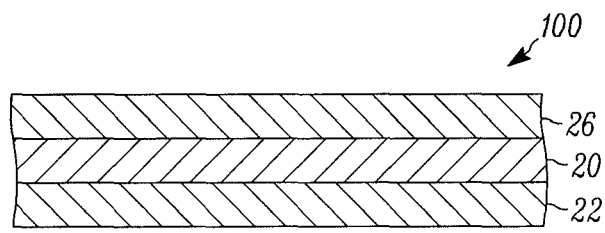
FIG. 3 is an elevation view of a multi-layer film in accordance with an embodiment of the present disclosure.

In an embodiment, a retort pouch 100 is made from a three-layer film as shown in FIG. 3. Retort pouch 100 is similar to retort pouch 10 with the exception that retort pouch 100 is made from a three-layer film, not a two-layer film. Sealant layer 22 contacts layer 20. A backing layer 26 contacts layer 20. Contact between layers can be "direct" (immediate and/or intimate touch) or "indirect" (intervening adhesive layer and/or intervening structure between film layers). In this configuration, layer 20 (corresponding to the second layer of the previously described film) becomes a core layer. Layer 26 is an outermost layer and corresponds to the third layer of the previously described film.

The thickness of layers 22, 20, and 26 may be the same or different.

In an embodiment, sealant layer 22 is coextruded to the core layer 20. The backing layer 26 is coextruded to the core layer 20. The sealant layer 22 and the backing layer 26 are each in direct and intimate contact with the layer 20. In other words, no intervening layers exist between the sealant layer 22 and the core layer 20. Similarly, no intervening layers exist between the backing layer 26 and the core layer 20.

In an embodiment, retort pouch 10 or retort pouch 100 includes a barrier layer.

The retort pouch 10/100 is designed to withstand a maximum applied temperature in the range of 120 to 135° C. (or any individual value or subrange therein) for 30 to 90 minutes without significant degradation.

The retort pouch is used to hold, protect, or preserve such nonlimiting items as foods, condiments, medicines and sterile solutions. The retort pouch can be "pillow shaped," or a "gusset" or a "stand-up" retort pouch. In "form and fill" packaging, the retort pouches are formed in line by making bottom and side seals from two films brought together in surface contact with one another, adding the material to be preserved, and forming the final seal to enclose the food or other substance to be packaged, all in a continuous operation. The resulting retort pouch is generally a pillow shaped pouch. Alternatively, the processor may employ pre-made pouches having a single open end, which are then filled and closed or sealed after filling. This technique is better suited for gusset retort pouches. In a final step the retort pouch and contents are normally heated to pasteurize, sterilize or cook the contents, such as by use of an oven or by pressurized steam in a retort.

The retort pouch may comprise two or more embodiments as disclosed herein.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, is a polymer that comprises a majority weight percent polymerized ethylene monomer (based on the weight of polymer), and optionally may comprise at least one polymerized comonomer.

"Hot tack initiation temperature" (HTIT) is the temperature at which the hot tack reaches 4 N/inch as sealing temperature increases.

"Hot tack temperature window" or "Delta T" is the temperature range in which the hot tack strength is greater than or equal to 6 N/inch.

The term "olefin-based polymer" is a polymer containing, in polymerized form, a majority weight percent of an olefin, for example ethylene or propylene, based on the weight of the polymer. Nonlimiting examples of olefin-based polymers include ethylene-based polymers and propylene-based polymers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which refers to polymers prepared from two different types of monomers or comonomers, terpolymers (which refers to polymers prepared from three different types of monomers or comonomers), tetrapolymers (which refers to polymers prepared from four different types of monomers or comonomers), and the like.

The term, "propylene-based polymer," as used herein, refers to a polymer that comprises a majority weight percent polymerized propylene monomer (based on the weight of the polymer), and optionally may comprise at least one polymerized comonomer.

Test Methods

Clarity is measured in accordance with ASTM D 1746.

Coefficient of friction for co-extruded films is measured between films with the outer (sealant) layer moved against the outer (sealant) layer of the blown film, as measured in accordance with ASTM D 1894 at room temperature (23° C.). A piece of film is held onto a horizontal bed. Another piece of film (of approximately 2.5 by 3 inches) is attached to the underside of a sled, which was placed over the top of the flat film bed. A TMI Monitor/Slip & Friction Tester, Model 32-06-00 was used to measure COF. The puling speed is 6 inches per minute. The forces required to initiate relative motion and to maintain constant motion were recorded and used to obtain the static and kinetic coefficients of friction, respectively. The values are an average of 5 readings.

Crystallinity—Differential Scanning Calorimetry (DSC) is used to measure crystallinity in ethylene-based (PE) samples and propylene-based (PP) samples. A sample is pressed into a thin film at a temperature of 190° C. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Density is measured in accordance with ASTM D 792-08.

Haze is measured in accordance with ASTM D 1003.

Heat seal strength of films is measured using Enepay MAGMA Hot Tack and Heat Seal Test System. The films are sealed at specified temperatures, and allowed to cool completely to room temperature (23° C.). The specimens are conditioned at 23° C. and 50% relative humidity for a minimum of 24 hours prior to testing. Sample films with heat seals are prepared in the following Examples section.

Hot Tack Testing—sample films (prepared in the following Examples section) are measured using an Enepay MAGMA Hot Tack and Heat Seal Test System (available from Enepay Corporation, Raleigh, N.C.), based on ASTM F 1921, Method B according to the following conditions:

TABLE 2

Hot Tack Testing Conditions of Co-extruded Films

| Parameter | Unit | Value |
|---|---|---|
| Specimen width: | mm | 25.4 |
| Sealing Time: | Sec. | 1.0 |
| Sealing Pressure: | N/mm$^2$ | 0.275 |
| Delay Time: | Sec. | 0.1 |
| Pulling Speed: | Mm/s | 200 |

Hot tack data is collected at 10° C. temperature increments.

Melt flow rate (MFR) is measured in accordance with ASTM D 1238 test method at 230° C. with a 2.16 kg weight.

Melt index (MI) is measured in accordance with ASTM D 1238 test method at 190° C. with a 2.16 kg weight.

Melting temperature (Tm) of polymer samples is measured by way of Differential Scanning Calorimetry (DSC). A sample is pressed into a thin film at a temperature of 190° C. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The melting point of a substance is the temperature at which the material changes from a solid to a liquid state. The melting point of a polymer is defined here as the temperature at which the heat of fusion reaches maximum.

By way of example and not by limitation, examples of the present disclosure will now be provided.

EXAMPLES

1. Polymeric Composition

Block composite, component (C) is prepared as described in ¶¶82-91 of co-pending U.S. patent application No. 61/248,160, filed on Oct. 2, 2009, the entire content of which is incorporated by reference herein.

The polymerization conditions for the production of block composites examples 02, 03 and 14 are provided in Table 3 below. The physical properties for resultant block composites 02, 03 and 14 are provided in Table 4.

The catalyst system includes the catalyst ([[rel-2',2'''-[(1R, 2R)-1,2-cylcohexanediylbis(methyleneoxy-κO)]bis[3 -(9H-carbazol-9-yl)-5-methyl [1,1'-biphenyl]-2-olato-κO]](2-)] dimethyl-hafnium) and cocatalyst, a mixture of methyldi ($C_{14-18}$ alkyl)ammonium salts of tetrakis(pentafluorophenyl) borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2., are purchased from Boulder Scientific and used without further purification.

The catalyst system also includes CSA (diethylzinc or DEZ) and modified methylalumoxane (MMAO) are purchased from Akzo Nobel and used without further purification. The solvent for the polymerization reactions is a hydrocarbon mixture (SBP 100/140) obtainable from Shell Chemical Company and purified through beds of 13-X molecular sieves prior to use.

TABLE 3

A Process conditions for production of block composites, examples 02, 03.

| Example | Solvent feed, kg/hr | Propylene feed, kg/hr | Ethylene feed, kg/hr | Hydrogen feed, SCCM | Temp, C. | Catalyst conc., ppm Hf | Catalyst solution flow, kg/hr | Cocatalyst conc., ppm | Cocatalyst solution flow, kg/hr | CSA Flow, g Zn/hr | MMAO flow, g/hr Al | Propylene Conversion, % | Calculated Split, % | Catalyst Efficiency, (gPoly/gM) * 10E6 |
|---|---|---|---|---|---|---|---|---|---|---|---|---|---|---|
| | | | | | | First Reactor Process Conditions | | | | | | | | |
| 02 | 166.4 | 6.2 | 9.8 | 13 | 95 | 19.9 | 0.164 | 199 | 0.136 | 10.4 | 0.43 | 91 | 70 | 4.72 |
| 03 | 104.1 | 3.6 | 6.0 | 13 | 95 | 9.9 | 0.109 | 199 | 0.045 | 6.1 | 0.25 | 90 | 42 | 8.74 |
| | | | | | | Second Reactor Process Conditions | | | | | | | | |
| 02 | 83.6 | 7.4 | | 10 | 95 | 59.9 | 0.59 | 1000 | 0.36 | 0 | | 90 | | 0.26 |
| 03 | 156.0 | 14.4 | | 10 | 93 | 59.9 | 0.55 | 1000 | 0.32 | 0 | | 90 | | 0.42 |

B Physical properties--block composite examples 02, 03

| Example | Wt % from Extraction | MFR @ 230° C. | Mw Kg/mol | Mw/Mn | Wt % $C_2$ | Tm (° C.) | Tc (° C.) | Melt Enthalpy (J/g) | Tg (° C.) by DSC | Wt % PP from HTLC Separation |
|---|---|---|---|---|---|---|---|---|---|---|
| 02 | 62.3 | 7.6 | 132 | 2.31 | 42.4 | 128 | 74.5 | 52 | −46 | 13.0 |
| 03 | 29.1 | 1.7 | 202 | 2.53 | 26.9 | 134 | 91 | 67 | −47 | 32.5 |

C Process conditions to produce block composite, example 14

| Example | Reactor Control Temp. (° C.) | Solvent Feed (lb/hr) | Propylene Feed (lb/hr) | Ethylene Feed (lb/hr) | Reactor Propylene Conc. (g/L) | Catalyst Efficiency ($g_{Pol}/g_M$) * $10^6$ | Catalyst Flow (lb/hr) | Catalyst Conc. (ppm) | Cocatalyst-1 Flow (lb/hr) | Cocat.-2 Flow (lb/hr) | DEZ Flow (lb/hr) | Production Rate (lb/hr) |
|---|---|---|---|---|---|---|---|---|---|---|---|---|
| | | | | | First Reactor Process Conditions | | | | | | | |
| 14 | 105 | 229 | 2 | 18 | 1.08 | 2.40 | 0.28 | 29 | 0.44 | 0.45 | 0.73 | 11 |
| | | | | | Second Reactor Process Conditions | | | | | | | |
| 14 | 93 | 343 | 32 | 0 | 1.97 | 0.44 | 0.66 | 100 | 0.66 | | | 34 |

D Physical properties-block composite, example 14

| Example | MFR @ 230° C. | Mw Kg/mol | Mw/Mn | Wt % $C_2$ | Tm (° C.) Peak 1 (Peak 2) | Tc (° C.) | Melt Enthalpy (J/g) | Tg (° C.) | Wt % PP from HTLC Separation |
|---|---|---|---|---|---|---|---|---|---|
| 14 | 5.8 | 151 | 2.9 | 37.5 | 127 (110) | 95 | 97 | −24 | 28 |

Each block composite example, 02, 03, and 14 contains (i) crystalline isotactic propylene homopolymer (iPP);

(ii) ethylene/propylene polymer (EP); and (iii) block copolymer (di-block) composed of iPP-block and EP-block.

Table 4 provides an analytical summary of block composite examples 02, 03, and 14. Unless indicated otherwise, properties in Table 4 are for the block composite (C).

TABLE 4

Analytical Summary of Block Composite, Component (C)--Examples

| Ex | Density | MFR @ 230° C. (g/10 min) | Mw Kg/mol | Mw/Mn | Wt % C2 | Estimated Wt fraction iPP (Hard) (C)(i) | Estimated Wt fraction EP (Soft) (C)(ii) | Estimated Block Composite Index | Estimated diblock (C) (iii) yield, wt % |
|---|---|---|---|---|---|---|---|---|---|
| 02 | 0.8688 | 7.6 | 132 | 2.31 | 42.4 | 0.30 | 0.70 | 0.19 | 19 |
| 03 | 0.8804 | 1.7 | 202 | 2.53 | 26.9 | 0.60 | 0.40 | 0.32 | 32 |
| 14 | 0.8997 | 5.8 | 151 | 2.9 | 37.5 | 0.60 | 0.40 | 0.55 | 55 |

2. Films

Polymeric composition composed of (A) propylene/α-olefin interpolymer, (B) ethylene-based polymer and (C) block composite is co-extruded into film structures. Components (A), (B), and (C) are dry-blended prior to addition into the feed hopper of the extruder.

Three layer co-extruded films are fabricated using a Colin Extrusion Blown Film Line with three extruders. The film fabrication conditions are shown in Table 5 below. Nylon Ultramid C33L01 is used as the backing layer (inside of the bubble). A blend of 90 wt % ATTANE 4201 (a commercial grade ultra low density ethylene/octene copolymer, available from the Dow Chemical Company) and 10 wt % AMPLIFY GR 205 (a maleic anhydride-grafted polymer HDPE, available from The Dow Chemical Company) is used as the core layer. The sealant layer compositions and respective three-layer film properties are shown in Table 6.

TABLE 5

Co-extruded 3-layer extrusion conditions

| Parameter | Unit | Value | | |
|---|---|---|---|---|
| Die Gap | mm | 2.0 | | |
| BUR | | 2.5 | | |
| Thickness | mils | 3.5 | | |
| Lay-flat width | cm | 23-24 | | |
| Haul-off Speed | m/min | 5.0-5.2 | | |
| Actual Rate | kg/hr | 10.4-13.1 | | |
| | | EX25-A | EX30-A | EX25-B |
| Layer Configuration | | Backing (bubble inside) | Core | Sealant (outer layer) |
| Layer Ratio | % | 25 | 50 | 25 |
| Melt Temperature | ° C. | 223-225 | 191-196 | 187-194 |
| Motor Load | amp | 1.3-2.1 | 6.1-6.5 | 1.7-4.0 |
| Screw Speed | rpm | 57-63 | 70-74 | 61-65 |

TABLE 6

Compositions of sealant layer and properties of three layer film

| Component | Polymer MI/MFR | Polymer Density | Unit | CS-1 1 | CS-V1 12 | CS-V2 13 | Ex-V1 15 | Ex-V2 14 |
|---|---|---|---|---|---|---|---|---|
| (B) AFFINITY PL1880G | 1.0 | 0.902 | | 100 | | | | |
| (A) H110-02N | 2.0 | 0.902 | | | | | | |
| (A) DS6D81** (5.1% C2) | 5.0 | 0.900 | | | | | | |
| (A) VERSIFY 2200 | 2.0 | 0876 | | | 100 | | 75 | |
| (A) VERSIFY 3200 | 8.0 | 0.876 | | | | 100 | | 75 |
| (C) Block composite (14 from Table 3, 4) | 5.8 | 0.8997 | | | | | 10 | 10 |
| (B) HDPE 12450N | 12 | 0.950 | | | | | 15 | 15 |
| Kinetic COF (F-M) | | | | 1.20 | 1.37 | 1.11 | 1.00 | 0.983 |
| Static COF (F-M) | | | | 1.37 | 1.54 | 1.30 | 1.15 | 1.12 |
| Haze | | | (%) | 0.63 | 0.756 | 1.66 | 2.38 | 1.83 |
| Clarity | | | (%) | 98.2 | 98.14 | 97.1 | 96.0 | 97.3 |
| Peak hot tack | | | (N/in) | 8.14 | 7.11 | 9.72 | 8.73 | 9.52 |
| HTIT (° C. 4 N/in) | | | (° C.) | 97 | 67 | 72 | 67 | 69 |
| Peak HT Temperature | | | (° C.) | 120 | 120 | 100 | 80 | 110 |
| Delta T (HT > 6 N/in) | | | (° C.) | 29 | 47 | 48 | 77 | 68 |
| HT at 150° C. | | | (n/in) | 4.3 | 4.9 | 4.1 | 5.9 | 5.0 |

**MFR measured @ 230° C.

CS = Comparative Samples

Ex = Examples of present disclosure

Hot Tack Temperature Window

Figure 5:
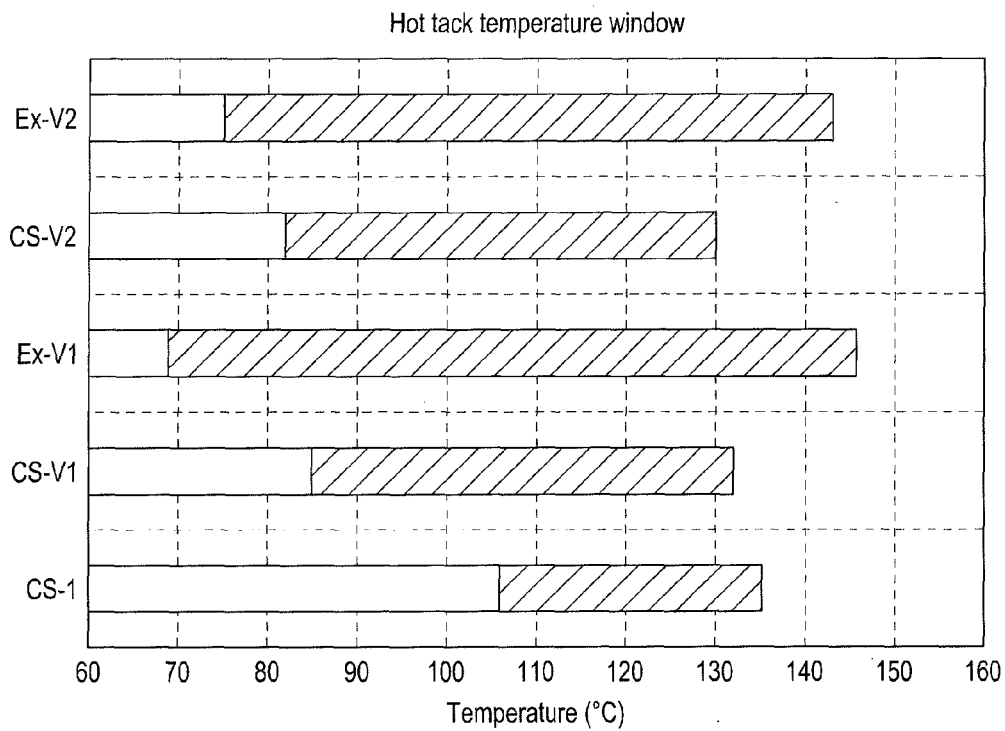
FIG. 5 is a graph showing the hot tack temperature window for comparative samples and embodiments of the present disclosure.

With the specified film structure, co-extruded films made with the present polymeric composition exhibit hot tack of greater than 6 N/in over a temperature range of at least about 50° C., or at least about 55° C., or at least about 60° C. (Table 5) based upon ASTM F 1921, Method B with a dwell time of 1.0 seconds and cooling time of 0.1 seconds. The hot tack temperature window data is shown in FIG. 5.

Hot Tack Initiation Temperature (HTIT)

The co-extruded films made with the present polymeric composition in the sealant layer exhibit comparable or lower hot tack initiation temperature, compared to the comparative samples. In general, a lower hot tack initiation temperature is desirable for improving processing and production rate of the packaging operation. Co-extruded films containing the present polymeric composition in the sealant layer exhibit lower HTIT than that of the films containing a SLEP in the sealant layer. The HTIT data is listed in Table 6.

Coefficient of Friction (COF)

Figure 7:
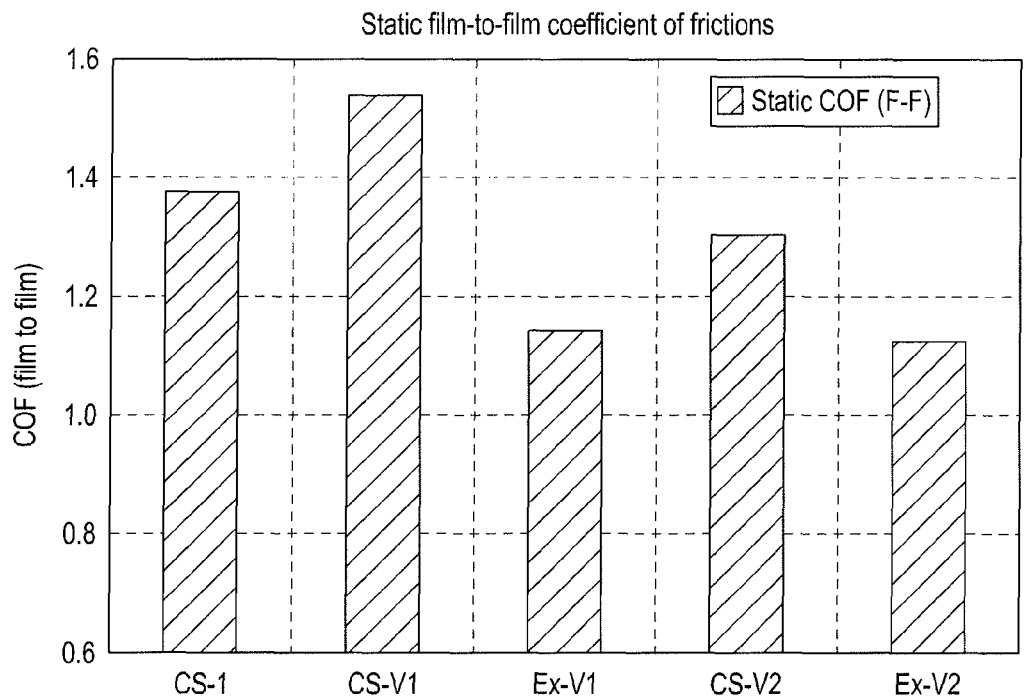
FIG. 7 is a graph showing friction coefficients for comparative samples and embodiments of the present disclosure.

In general, a lower COF is desirable for enhanced processing and/or faster packaging speed. The COF data are shown in Table 6 and in FIG. 7. The co-extruded films with sealant layer made with the present polymeric composition exhibit lower COF, compared with comparative samples made with SLEP and polypropylene-based polymers.

Hot Tack Strength at Elevated Temperatures

Figure 4:
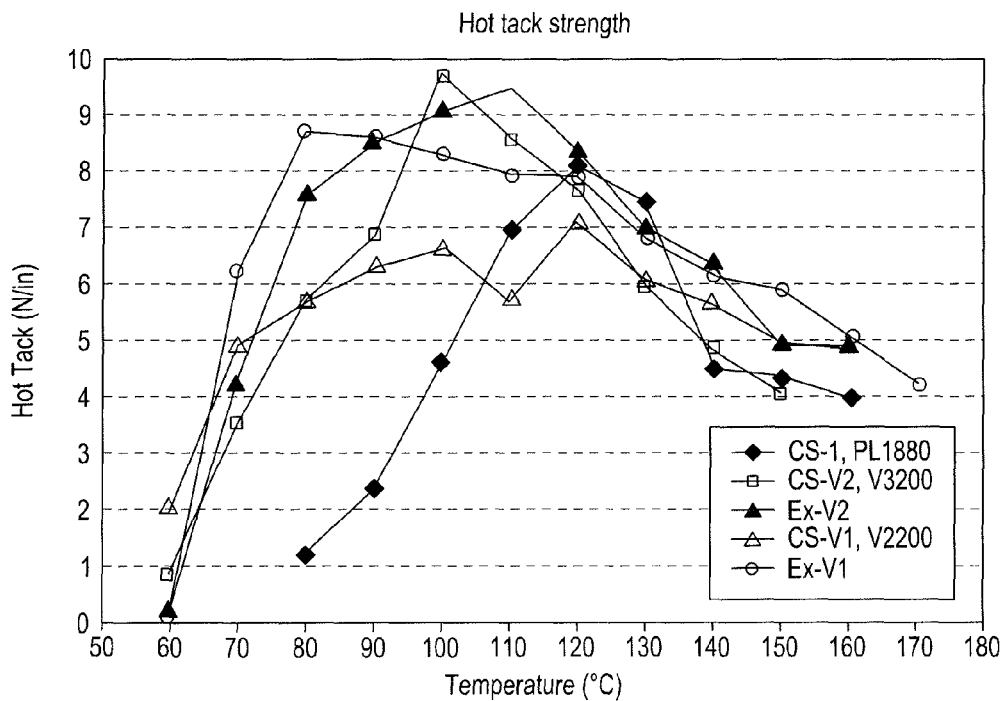
FIG. 4 is a graph showing hot tack strength and temperature for comparative samples and embodiments of the present disclosure.
Figure 6:
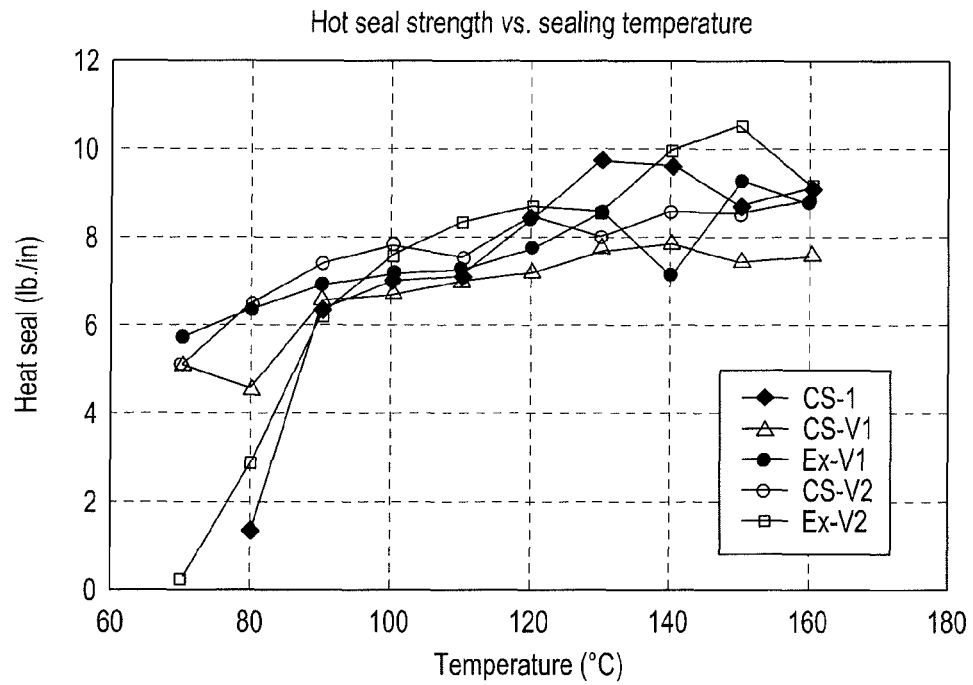
FIG. 6 is a graph showing heat seal strength and sealing temperature for comparative samples and embodiments of the present disclosure.

Another very useful aspect of the present examples is their hot tack strength at elevated temperatures, such as at 150° C. Higher hot tack strength at high temperatures allows packaging and/or processing of the contents at elevated temperatures, such as sterilization via boiling water or other heating mechanisms, for use in retort applications. As shown in FIGS. 4 and 6, and in Table 6, the hot tack values of the present examples at 150° C. are higher than that of the corresponding comparative samples.

Optical Properties

Figure 8:
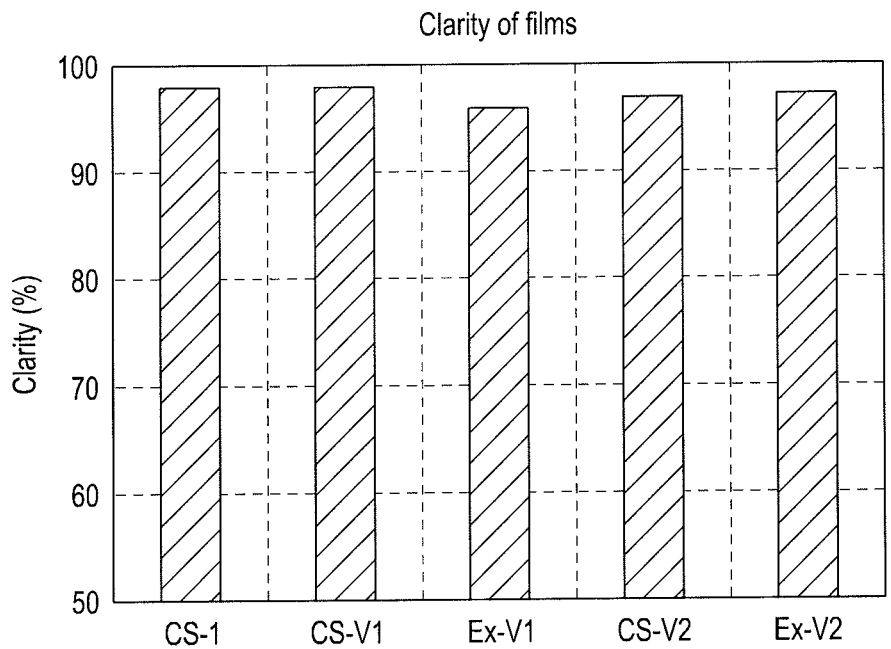
FIG. 8 is a graph showing the clarity for comparative samples and embodiments of the present disclosure.
Figure 9:
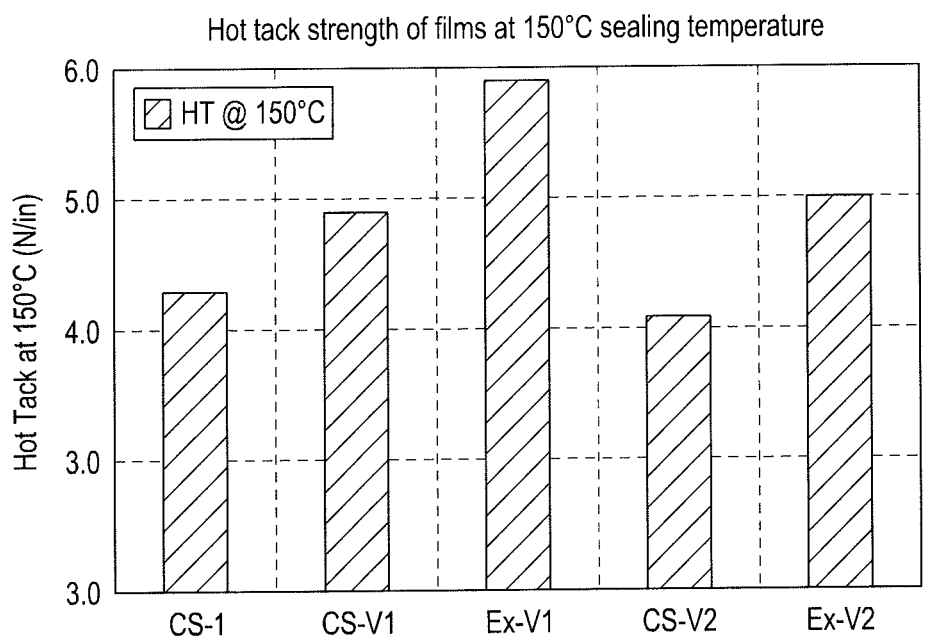
FIG. 9 is a graph showing hot tack strength at 150° C. for comparative samples and embodiments of the present disclosure.

The present examples display very good optical properties, as shown in Table 6 and in FIGS. 8 and 9. The haze values of the films containing sealants of the comparative samples and present examples are all below 2.5, and the clarity of these films is higher than 96%.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A film comprising:
a first layer comprising a polymeric composition comprising:
(A) a propylene/α-olefin interpolymer;
(B) an ethylene-based polymer;
(C) a block composite comprising:
i) a propylene-based crystalline polymer;
ii) an ethylene/α-olefin polymer; and
iii) a block copolymer comprising a propylene-based crystalline block and an ethylene/α-olefin block; and
a second layer comprising an olefin-based polymer.

2. The film of claim 1 wherein Component (A) comprises a propylene/ethylene copolymer having a density from 0.85 g/cc to 0.90 g/cc.

3. The film of claim 1 wherein Component (A) has a melt flow rate from 0.5 g/10 min to 10 g/min.

4. The film of claim 1 wherein Component (B) comprises an ethylene-based polymer having a density greater than 0.941 g/cc.

5. The film of claim 1 wherein Component (B) has a melt index from 1.0 g/10 min to 20.0 g/10 min.

6. The film of claim 1 wherein the block copolymer (C)(iii) comprises a diblock with the formula (1) below:

$$(EP)\text{-}(iPP) \quad (1)$$

wherein EP represents a segment of polymerized ethylene and propylene monomeric units, and iPP represents a segment of isotactic propylene homopolymer.

7. The film of claim 1, wherein block composite (C) comprises greater than 15 wt % of C(iii), based on the total weight of block composite (C).

8. The film of claim 1 wherein block composite (C) has a density from 0.88 g/cc to 0.90 g/cc and a melt index from 1 g/10 min to 50 g/10 min.

9. The film of claim 1 wherein the polymeric composition further comprises an olefin-based polymer.

10. The film of claim 1 wherein the second layer comprises an olefin-based polymer and optionally a functionalized olefin-based polymer.

11. A retort pouch comprising:
the film of claim 1; and
an optional third layer.

12. The retort pouch of claim 11 wherein the first layer is a sealant layer and the second layer comprises from 70 wt % to 99 wt % of an olefin-based polymer and from 30 wt % to 1 wt % of a functionalized olefin-based polymer.

13. The retort pouch of claim 11 wherein the third layer comprises a material selected from the group consisting of nylon, polyethylene terephthalate (PET), polypropylene, and combinations thereof.

* * * * *